US012022343B2

(12) United States Patent
Chang et al.

(10) Patent No.: US 12,022,343 B2
(45) Date of Patent: Jun. 25, 2024

(54) METHOD FOR RADIO LINK FAILURE RECOVERY AND USER EQUIPMENT

(71) Applicant: SHARP KABUSHIKI KAISHA, Sakai (JP)

(72) Inventors: Ningjuan Chang, Shanghai (CN); Chongming Zhang, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 384 days.

(21) Appl. No.: 17/617,916

(22) PCT Filed: Jun. 12, 2020

(86) PCT No.: PCT/CN2020/095809
§ 371 (c)(1),
(2) Date: Dec. 9, 2021

(87) PCT Pub. No.: WO2020/249081
PCT Pub. Date: Dec. 17, 2020

(65) Prior Publication Data
US 2022/0312282 A1    Sep. 29, 2022

(30) Foreign Application Priority Data
Jun. 13, 2019   (CN) .......................... 201910514658.7

(51) Int. Cl.
*H04W 36/00* (2009.01)
(52) U.S. Cl.
CPC . *H04W 36/00835* (2018.08); *H04W 36/0079* (2018.08)

(58) Field of Classification Search
CPC ....... H04W 36/00835; H04W 36/0079; H04W 36/00837; H04W 36/0085; H04W 24/08; H04W 36/305; H04W 36/36; H04W 76/19
See application file for complete search history.

(56) References Cited

U.S. PATENT DOCUMENTS

| 2019/0223073 | A1* | 7/2019 | Chen | H04W 36/365 |
| 2019/0357066 | A1* | 11/2019 | Kim | H04W 24/10 |
| 2020/0351968 | A1* | 11/2020 | Yilmaz | H04W 76/15 |
| 2021/0168678 | A1* | 6/2021 | Deenoo | H04W 76/19 |
| 2022/0007246 | A1* | 1/2022 | de Silva | H04W 48/20 |
| 2022/0014985 | A1* | 1/2022 | Da Silva | H04W 36/00838 |

(Continued)

FOREIGN PATENT DOCUMENTS

WO    2019/195060 A1    10/2019

OTHER PUBLICATIONS

Intel Corporation, "Offline discussion #34", R2-1902612, 3GPP TSG RAN WG2 Meeting #105, Athens, Greece, Feb. 25-Mar. 1, 2019.

(Continued)

*Primary Examiner* — Rushil P. Sampat
(74) *Attorney, Agent, or Firm* — ScienBiziP, P.C.

(57) ABSTRACT

Provided are a method for radio link failure recovery and user equipment. The method for radio link failure recovery includes: determining whether a radio link failure (RLF) occurs on a radio link of user equipment (UE); when the RLF occurs on the UE, if the UE is configured with a conditional handover, then executing a cell selection procedure; and performing a radio link failure recovery operation according to a cell selection result of the cell selection procedure.

4 Claims, 2 Drawing Sheets

(56) References Cited

U.S. PATENT DOCUMENTS

2022/0110180 A1\*  4/2022  Jung ..................... H04W 24/10
2022/0201582 A1\*  6/2022  Eklöf ................... H04W 24/08

OTHER PUBLICATIONS

Intel Corporation, "Failure handling on CHO", R2-1906292, 3GPP TSG RAN WG2 Meeting #106, Reno, USA, May 13 to 17, 2019.
"3rd Generation Partnership Project; Technical Specification Group Radio Access Network; NR; Radio Resource Control (RRC) protocol specification(Release 15)", 3GPP TS 38.331 V15.5.1 (Apr. 2019).
"3rd Generation Partnership Project; Technical Specification Group Radio Access Network; NR; User Equipment (UE) procedures in Idle mode and RRC Inactive state(Release 15)", 3GPP TS 38.304 V15.3.0 (Mar. 2019).
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.1 (Apr. 2019).
China Telecom et al., "New Work Item on even further Mobility enhancement in E-UTRAN", RP-190272, 3GPP TSG RAN meeting #83, Shenzhen, China, Mar. 18-21, 2019.
Intel Corporation, "New WID: NR mobility enhancements", RP-181433, 3GPP TSG RAN Meeting #80, La Jolla, USA, May 21-May 25, 2018.

\* cited by examiner

METHOD FOR RADIO LINK FAILURE RECOVERY AND USER EQUIPMENT

TECHNICAL FIELD

The present disclosure relates to the technical field of wireless communications. More specifically, the present disclosure relates to a method for radio link failure recovery and corresponding user equipment.

BACKGROUND

A new research project on 5G technical standards (see non-patent literature: RP-181433: New WID on NR (New Radio) mobility enhancements) was approved in the 3rd Generation Partnership Project (3GPP) RAN #80 plenary session held in June 2018. In addition, there is another new research project on Release 16 (see non-patent literature: RP-190272: WID for Even Further Mobility Enhancement in Evolved-Universal Terrestrial Radio Access Network (E-UTRAN)). One of the research objectives of these two projects is to meet one of the mobility requirements in a network: seamless handover, namely, to achieve a handover interruption time of 0 millisecond or close to 0 millisecond in a cell handover procedure and to improve the robustness of a handover. Among currently studied solutions for reducing a handover interruption time and/or to improve the robustness of a handover, a solution is referred to as a conditional handover (CHO). In a CHO mechanism, a base station delivers a handover command to UE in advance, wherein the handover command includes conditional configuration information. When a configured condition is met, then the UE executes a handover according to the previously received handover command. In this case, by delivering the handover command in advance, the success rate of receiving a handover command can be improved, thereby improving the success rate of a handover, and avoiding a service interruption delay caused by a handover failure resulting from a failure in receiving a handover command.

Provided in the present disclosure are solutions to some problems encountered in implementation of the CHO in an NR system and in a long term evolution (LTE) system.

SUMMARY OF INVENTION

An objective of embodiments of the present disclosure is to provide a solution to the issue of implementing a CHO technology in an NR system and in an LTE system. More specifically, provided in the present disclosure is a solution to the issue of how to use a stored CHO configuration to resume a link connection during a radio link failure. Provided in the embodiments of the present disclosure are a method for radio link failure recovery in user equipment and corresponding user equipment.

According to a first aspect of the present disclosure, a method for radio link failure recovery is provided, and comprises: determining whether a radio link failure (RLF) occurs on a radio link of user equipment (UE); when the RLF occurs on the UE, if the UE is configured with a conditional handover, then executing a cell selection procedure; and performing a radio link failure recovery operation according to a cell selection result of the cell selection procedure.

In the above method for radio link failure recovery according to the first aspect, when the cell selection procedure is executed, a cell selection monitoring timer T is started.

In the above method for radio link failure recovery according to the first aspect, if a selected cell is a conditional handover candidate cell, then the following operations are performed: the cell selection monitoring timer T is stopped, and a handover to the selected cell is performed; if the selected cell is not a conditional handover candidate cell, then the following operations are performed: the cell selection monitoring timer T is stopped, and an RRC connection re-establishment procedure is initiated; and if a suitable cell is not selected in the cell selection procedure, namely, if the cell selection monitoring timer T expires, then the UE performs an operation of entering an RRC idle state.

In the above method for radio link failure recovery according to the first aspect, the cell selection procedure is executed in accordance with a cell selection procedure in standard protocol specification 38.304.

According to a second aspect of the present disclosure, a method for radio link failure recovery is provided, and comprises: initiating, by user equipment (UE), an RRC connection re-establishment procedure; if a reason for initiating the RRC connection re-establishment procedure is that a radio link failure (RLF) of a main cell group (MCG) is detected, then executing a cell selection procedure; if a selected cell is a conditional handover candidate cell of the UE and the UE is configured with a conditional handover, then performing, by the UE, a handover to the selected cell; if the selected cell is not a conditional handover candidate cell of the UE, then performing, by the UE, an RRC re-establishment initialization operation.

In the above method for radio link failure recovery according to the second aspect, if the UE is not configured with any conditional handover, or if the reason for initiating the RRC connection re-establishment procedure is not that an RLF of the MCG is detected, then the UE executes the RRC re-establishment initialization operation.

In the above method for radio link failure recovery according to the second aspect, the RRC re-establishment initialization operation comprises at least one of the following operations: operation 1, a secondary cell(s) of the MCG is released; operation 2, a configuration of special cell(s) is released; operation 3, a delay budget reporting configuration (delayBudgetReportingConfig) is released, and a corresponding delay budget reporting timer T342 is stopped; and operation 4, an overheating assistance configuration (overheatingAssistanceConfig) is released, and a corresponding overheating indication prohibition timer T345 is stopped.

In the above method for radio link failure recovery according to the second aspect, the special cell is a primary cell (PCell) of the master cell group (MCG) or a primary secondary cell (PSCell) of a secondary cell group (SCG).

According to a third aspect of the present disclosure, user equipment (UE) is provided, and comprises: a processor; and a memory storing instructions, wherein the instructions, when run by the processor, perform the method for radio link failure recovery according to the context.

BRIEF DESCRIPTION OF THE DRAWINGS

In order to understand the present disclosure and advantages thereof more fully, reference will now be made to the following description made in conjunction with the accompanying drawings.

DETAILED DESCRIPTION

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present disclosure, a handover refers to change of a primary cell initiated by a network side, the change including inter-cell change of a primary cell and intra-cell change of a primary cell. That is, a primary cell of UE is changed from a source cell to a target cell, wherein the source cell and the target cell may be the same cell or different cells. In this procedure, a secret key or a security algorithm for access layer security is also updated. The source cell may also be referred to as a source base station, or may also be a source beam or a source transmission point (TRP). The target cell may also be referred to as a target base station, or may also be a target beam or a target transmission point. The source cell refers to a connected cell serving the UE before a handover procedure is initiated, namely, a cell transmitting to the UE an RRC message including a handover command. The target cell refers to a cell connected to and serving the UE after the handover procedure is successfully completed, or a cell indicated by a target cell identifier included in the handover command. The handover command described in the present disclosure is used to trigger the UE to execute a handover. In an NR system, the handover command is an RRC reconfiguration message including a synchronized reconfiguration (Reconfigurationwithsync) information element, or rather, the handover command is an RRC reconfiguration message including a synchronized reconfiguration (Reconfigurationwithsync) information element for a master cell group (MCG). In an LTE system, the handover command is an RRC connection reconfiguration message including a mobility control information (MobilityControlInformation) information element. The synchronized reconfiguration information element or the mobility control information information element includes configuration information of the target cell, for example, the target cell identifier, a target cell frequency, common configurations of the target cell such as system information, a random access configuration used by the UE to access the target cell, a security parameter configuration of the UE in the target cell, a radio bearer configuration of the UE in the target cell, and the like. For simplicity of description, in the present disclosure, the RRC reconfiguration message is equivalent to the RRC connection reconfiguration message; similarly, an RRC reconfiguration complete message serving as a response message thereto is equivalent to an RRC connection reconfiguration complete message. The handover command is equivalent to the RRC message including the handover command, and refers to an RRC message or a configuration in the RRC message triggering the UE to execute a handover. The handover configuration refers to all of or part of configurations in the handover command. "Cancel", "release", "delete", "flush", and "clear" are interchangeable. "Execute", "use", and "apply" are interchangeable. "Configure" and "reconfigure" are interchangeable. "Monitor" and "detect" are interchangeable. A conditional handover command and a conditional handover configuration are interchangeable.

In the present application, after receiving a radio resource control (RRC) message including a handover command, the UE maintains communication, including data transmission, with the source base station before initiating a handover procedure so as to further reduce data transmission interruption time.

Figure 1:
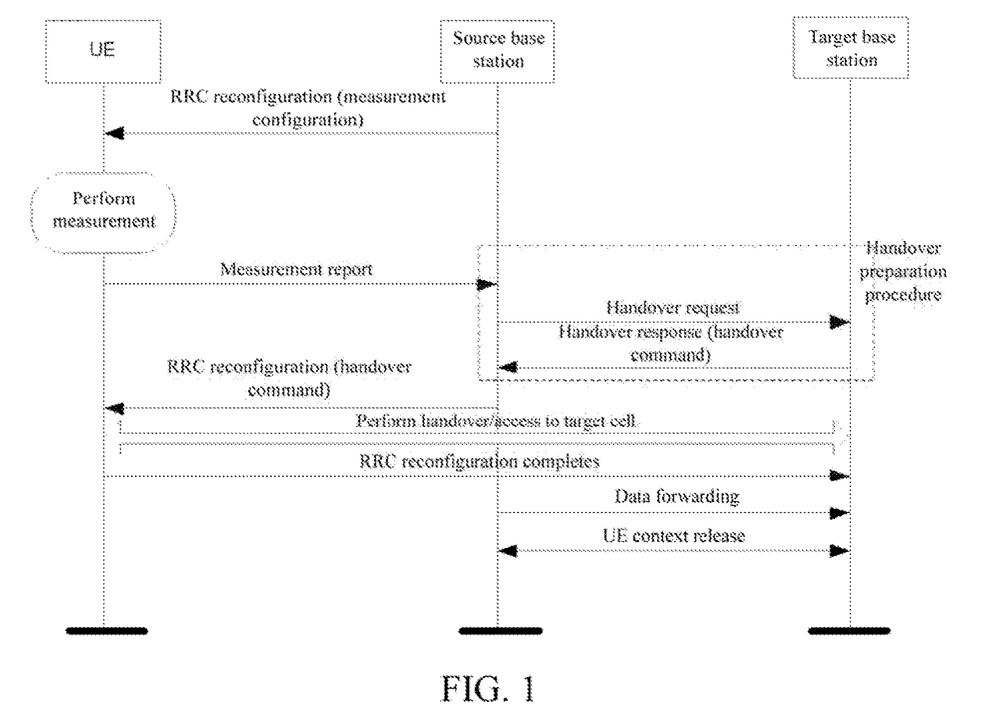
FIG. 1 is a sequence diagram showing that user equipment (UE) in a connected state changes a serving cell by means of a handover procedure.

Firstly, a general handover procedure in an LTE/NR system is briefly described. User mobility in a connected state is implemented mainly by means of a handover procedure, and the handover refers to a procedure in which UE in an RRC connected state changes a serving cell. FIG. 1 is a sequence diagram showing that user equipment (UE) in a connected state changes a serving cell by means of a handover procedure. As shown in FIG. 1, the handover procedure generally includes the following phases:

Phase 1, a measurement phase. A base station delivers a measurement configuration to user equipment (UE); the UE performs, on the basis of the measurement configuration, measurement on a radio link corresponding to a serving cell or a neighboring cell; when a configured measurement reporting condition is met, the UE transmits a measurement report to the base station. The measurement phase is not mandatory, and the base station may also perform a blind handover to UE if the base station does not have any valid measurement report.

Phase 2, a handover preparation phase. The base station determines, according to the received measurement report and other factors such as a payload of the base station, whether to trigger a handover for the UE. If it is determined to trigger a handover for the UE, then a source base station initiates a handover preparation procedure by transmitting a handover request message to a target base station. The target base station determines, according to context of the UE in the handover request message, available resources of the target base station, and other factors, whether to admit this handover request for the UE. If so, then the target base station replies a handover acknowledgment message to the source base station, wherein the handover acknowledgment message includes an inter-node RRC message, namely, a handover command.

Phase 3, a handover execution phase. The source base station delivers the handover command to the UE, and starts to forward data of the UE to the target base station. UE receiving the handover command immediately uses a configuration in the handover command to execute a handover, accesses the target base station by means of a random access procedure, and transmits an acknowledgment message to the target base station. The random access procedure is not mandatory.

Phase 4, a handover completion phase. After confirming that the UE successfully accesses the target base station, the target base station transmits a handover complete message to the source base station. According to the handover complete message, the source base station may release the UE context stored thereon.

It can be learned from the above that the handover procedure in the current system may incur data transmission interruption. In an LTE system of a Release 14 version, optimizations for the handover procedure such as a random access procedure-free handover, a make before break (MBB), and the like all aim to reduce data interruption time in the handover procedure.

Then, a conditional handover is briefly described. As described above, requirements of Release 16 technologies include a data interruption delay possible of "0 ms" in a mobility handover procedure and improved robustness of a handover so as to meet mobility requirements for a seamless handover in the NR. In the current handover procedure, one reason for a handover failure and therefore a long data transmission interruption is a handover command receiving failure caused when the handover command is not delivered in a timely manner. A feasible method to address this problem is a handover based on condition (referred to simply as a conditional handover). In the conditional handover, a relatively conservative measurement report threshold is set, so that the base station acquires a measurement result in advance, and performs handover preparation with a selected target base station in advance according to the measurement result. In this case, the base station can deliver the handover command to the UE before an actual handover condition (relative to the conservative measurement report threshold) is met, wherein the handover command carries a handover execution condition. Different from existing handover mechanisms for the LTE, after receiving a conditional handover command, the UE does not execute a handover immediately but stores a received handover command configuration, and starts to monitor link quality of the source cell or link quality of the target cell according to a handover condition carried in the handover command message. Only when it is determined, by means of monitoring, that the configured handover condition is met, does the UE start to execute the stored handover command and access the target cell. In the present disclosure, the above handover mechanism is referred to as a conditional handover. However, the name thereof is not limited, and the above handover mechanism may also be referred to as a handover mechanism supporting an advance handover command, a preliminary handover, early handover preparation, or the like.

Next, an existing link recovery mechanism is described. In the existing mechanism, when a radio link failure (RLF) of a master cell group occurs, the UE initiates an RRC connection re-establishment procedure to re-establish/resume a connection to a network side. After initiating the RRC connection re-establishment procedure, the UE executes a cell selection procedure to select a re-establishment cell, and transmits a re-establishment request message to the same.

After the UE is configured with a conditional handover, the UE does not execute a handover immediately, but executes the handover according to a received or stored conditional handover configuration after a corresponding condition is met. During a time period from a time point when the UE receives the conditional handover configuration to a time point when the UE executes the handover according to the received conditional handover configuration, the UE still maintains communication with the source base station. During this time period, a radio link failure (RLF) between the UE and the source base station may occur. At the 106th meeting of the 3GPP RAN2 working group, the following conclusion was reached on the case in which the handover condition of the above conditional handover is not met and an RLF occurs: when an RLF occurs, UE performs cell selection; if a selected cell is a conditional handover candidate cell, then the UE executes a handover to this cell to resume connection to a network side instead of initiating an RRC connection re-establishment procedure; if the selected cell is not a conditional handover candidate cell, then the UE initiates an RRC connection re-establishment procedure to resume the connection to the network side. In the present disclosure, this enhanced link recovery mechanism is referred to as a link failure recovery mechanism based on a conditional handover configuration (for simplicity of description, this mechanism is simply referred to as a conditional handover link recovery mechanism). The conditional handover candidate cell refers to a (target) cell in the conditional handover configuration in the RRC message for configuring the conditional handover received by the UE, namely, a cell indicated by a cell identifier in the synchronized reconfiguration information element (ReconfigurationWithSync) or the mobility control information element (MobilityControlInfo). The network side can configure one or a plurality of handover condition candidate cells for the UE at the same time. For the conditional handover link recovery mechanism, on the basis of existing protocol specifications, a plurality of implementation methods are available, and examples are as follows.

Implementation method 1: when an RLF occurs on UE configured with a conditional handover, the UE firstly executes a cell selection procedure; if a selected cell is a conditional handover candidate cell, then the UE executes a handover to this cell according to a conditional handover configuration corresponding to this cell; if the selected cell is not a conditional handover candidate cell, then the UE initiates an RRC connection re-establishment procedure.

Implementation method 2: when an RLF occurs on UE configured with a conditional handover, the UE initiates an RRC connection re-establishment procedure. According to the existing mechanism, in an initialization phase of the RRC connection re-establishment procedure, the UE executes a cell selection procedure. If a selected cell is a conditional handover candidate cell, then the UE executes a handover to this cell according to a conditional handover configuration corresponding to this cell, and ends the RRC connection re-establishment procedure; if the selected cell is not a conditional handover candidate cell, then the UE continues the RRC connection re-establishment procedure, and transmits an RRC connection re-establishment request message to the selected re-establishment cell.

Implementation method 3: when an RLF occurs on UE configured with a conditional handover, the UE determines whether a suitable cell exists among candidate cells in a conditional handover configuration. If one of the conditional handover candidate cells is the suitable cell, then the UE executes a handover to this cell according to a conditional handover configuration corresponding to this cell; if none of the conditional handover candidate cells is the suitable cell, then the UE initiates an RRC connection re-establishment procedure. The suitable cell refers to a cell meeting a cell selection S criterion, and the definition thereof can be found in 3GPP protocol specification 38.304.

Provided in the present disclosure is a solution mainly to the problem of how to cause UE configured with a conditional handover to resume connection to a network side when an RLF occurs. More specifically, regarding implementation method 1, the present disclosure focuses on how to monitor the cell selection procedure. In implementation method 2, the UE always initiates an RRC connection re-establishment procedure and then performs an initialization operation of the RRC connection re-establishment procedure, and these operations are performed by the UE to perform RRC connection re-establishment. However, if the cell selected by the UE in the cell selection procedure is a conditional handover candidate cell, then the initialization operation is not necessary, and therefore the present disclosure further focuses on how to process the initialization operation.

In addition, the 3GPP RAN2 working group is currently discussing a fast MCG link recovery mechanism. The fast MCG link recovery mechanism is provided relative to the existing link recovery mechanism (that is, link connection is resumed by means of an RRC connection re-establishment procedure). In the fast MCG link recovery mechanism, when an RLF occurs on the MCG of the UE, if link quality of a secondary cell group (SCG) of the UE is good (that is, no RLF occurs, or a timer T310 is not running, or the SCG is not suspended), then the UE initiates an MCG failure (information) procedure, and reports MCG link failure information to a primary base station by means of an SCG link instead of directly initiating an RRC connection re-establishment procedure. The primary base station receiving the MCG link failure information report may transmit an RRC connection reconfiguration message to the UE to trigger the UE to execute a handover to a new cell or transmit an RRC release message to release the connection of the UE. This fast MCG link recovery mechanism/procedure can be applied to the case in which multi-radio access technology dual connectivity (MR-DC), for example, NR E-UTRA dual connectivity (NE-DC), E-UTRA NR dual connectivity (EN-DC), new radio dual connectivity (NR DC), next generation-radio access network E-UTRA NR dual connectivity (NGEN-DC), intra-E-UTRAN DC (LTE DC), or the like, is configured. In the present disclosure, the name of the fast MCG link recovery mechanism is not limited. For example, the fast MCG link recovery mechanism may also be referred to as SCG-based MCG recovery, an MCG failure procedure, MCG failure information, enhanced MCG link recovery, or the like.

The present disclosure further focuses on how to perform failure recovery if the UE is configured with both a conditional handover and an SCG when an MCG RLF occurs.

Hereinafter, specific examples and embodiments related to the present invention are described in detail. In addition, as described above, the examples and embodiments described in the present disclosure are illustrative descriptions for facilitating understanding of the present invention, rather than limiting the present invention.

Embodiment 1

Provided in this embodiment is a solution to the problem of how to monitor the cell selection procedure when implementation method 1 is used. On the basis of the method in this embodiment, UE can determine, in a timely manner, whether a suitable cell is selected, thereby avoiding overly long link failure interruption time caused by an endless cell selection procedure.

In step 1, an RLF occurs on a radio link of UE. More precisely, the RLF occurs on an MCG link.

In step 2, if the UE is configured with a conditional handover, then the UE performs the following operations:

operation 1, a cell selection monitoring timer T is started; and operation 2, a cell selection procedure is executed. The cell selection procedure is executed in accordance with a cell selection procedure in standard protocol specification 38.304.

In this step, the UE being configured with a conditional handover may also refer to that the UE has the stored conditional handover configuration.

Figure 2:
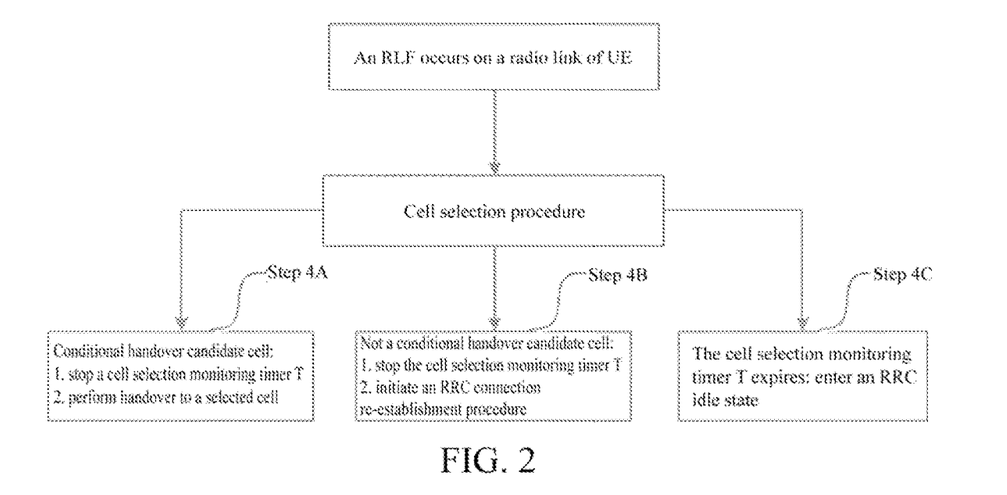
FIG. 2 is a schematic diagram showing a link recovery procedure when an RLF occurs on UE in embodiment 1.

In step 3, the cell selection procedure of step 2 selects a suitable cell. FIG. 2 is a schematic diagram showing a link recovery procedure existing when an RLF occurs on the UE in embodiment 1. As shown in FIG. 2, if a selected cell is a conditional handover candidate cell, then step 4A is performed. If the selected cell is not a conditional handover candidate cell, then step 4B is performed. If the cell selection procedure does not select a suitable cell, namely, the cell selection monitoring timer T expires, then the UE performs step 4C.

The selected cell being a conditional handover candidate cell may also be that the selected cell is included in the stored conditional handover configuration, and preferably, the selected cell is included in a synchronized reconfiguration information element (ReconfigurationWithSync) in the stored conditional handover configuration.

In an NR system, the selected suitable cell is an NR cell; in an LTE system, the selected suitable cell is an LTE/E-UTRAN cell.

In step 4A, the UE performs the following operations:

operation 1, the cell selection monitoring timer T is stopped; and operation 2, a handover to the selected cell is executed. That is, a handover to this cell is executed according to the stored conditional handover configuration corresponding to this cell (or referred to as a synchronized reconfiguration). In this operation, the UE can execute a handover to this cell and resume communication with a network side as soon as possible without the need to wait until a condition corresponding to the conditional handover candidate cell is met. The operation of executing a conditional handover includes one or a plurality of the following: a timer T304 is started; a target cell RRC configuration in a conditional handover configuration corresponding to a target cell is executed; a configuration in a synchronized reconfiguration information element corresponding to the target cell is executed; downlink synchronization to the target cell is performed; random access to the target cell is performed; and an RRC reconfiguration complete message is generated and submitted to a lower layer, and is transmitted.

In step 4B, the UE performs the following operations:

operation 1, the cell selection monitoring timer T is stopped; and operation 2, an RRC connection re-establishment procedure is initiated.

In step 4C, an operation of entering an RRC idle state is performed, and a reason for RRC release is that RRC connection fails. For the operation of entering the RRC idle state, please refer to section 5.3.11 of protocol specification 38.331.

Optionally, in step 3, if the cell selected by the cell selection procedure is a cell of a different radio access technology (namely, an inter-RAT cell), then the UE performs step 4C.

Obviously, this embodiment further includes the following steps prior to step 1: the UE receives an RRC message including a conditional handover command from a base station, stores a handover configuration in the handover command, and determines, by means of monitoring and according to a handover condition, whether the handover condition is met. The handover configuration refers to an RRC configuration generated by the UE according to the configuration in the handover command. Optionally, the handover configuration refers to an RRC configuration generated by the UE according to the configuration in the handover command and a current RRC configuration of the UE. The handover condition, namely that the UE executes a handover only when the condition is met, uses the handover configuration, and the handover condition is included in the conditional handover command. For example, the handover condition is a measurement event. For example, the condition is a measurement event A3 (signal quality in a neighboring cell is superior to that in a serving cell by an offset value for a period of time). The neighboring cell corresponds to the target cell for handover. Generally, all of measurement events defined in current 3GPP standard specifications 36.331 and 38.331 (see section 5.5.4), such as A1-A5, can be included in the conditional handover command as handover conditions.

In this embodiment, the method further includes the following step prior to step 1: the UE receives an RRC message including a configuration of the cell selection monitoring timer T for a conditional handover recovery mechanism. The RRC message may be system information, or may also be a dedicated RRC message such as an RRC reconfiguration message. The configuration of the timer T is the value of the timer.

Embodiment 2

Provided in this embodiment is a solution to the problem of how to process the initialization operation of the RRC connection re-establishment procedure in foregoing implementation method 2. On the basis of the method in this embodiment, information related to a source cell in the initialization operation is not released in advance, thereby ensuring that UE can correctly use a configured RRC parameter(s) when selecting a conditional handover candidate cell to perform link failure recovery.

In step 1, UE initiates an RRC connection re-establishment procedure.

In step 2, during initialization of the RRC connection re-establishment procedure, in a case that the UE is not configured with conditional handover configuration or the reason for initiating the RRC connection re-establishment procedure is not that an RLF of the MCG is detected, then the UE performs the following RRC re-establishment initialization operations:

Operation 1, release secondary cell(s) of the MCG.

Operation 2, release a configuration of a special cell (spCellConfig information element, including a configuration parameter(s) of the special cell). The special cell refers to a primary cell (PCell) of the MCG or a primary secondary cell (PSCell) of an SCG.

Operation 3, release a delay budget reporting configuration (delayBudgetReportingConfig), and stop a corresponding delay budget reporting timer T342, wherein the delayBudgetReportingConfig information element is used to configure delay budget reporting, and includes a value indicating whether to enable delay budget reporting of the UE or a delay budget reporting prohibition timer.

Operation 4, release an overheating assistance configuration (overheatingAssistanceConfig), and stop a corresponding overheating indication prohibition timer T345. The overheatingAssistanceConfig information element is used to configure a value indicating whether to enable overheating assistance information reporting of the UE or the overheating indication prohibition timer.

In this step, the reason for initiating the RRC connection re-establishment procedure being not that an RLF of the MCG is detected refers to that a reason for the UE to initiate the RRC connection re-establishment procedure is that a synchronized reconfiguration of the MCG fails, mobility from NR fails or mobility from LTE/E-UTRAN fails, an SRB1-related or SRB2-related integrity check failure indication from a lower layer is received, an RRC connection reconfiguration fails, or the like.

In step 3, in a cell selection procedure in the RRC connection re-establishment procedure, when a suitable cell is selected, if the UE is configured with a conditional handover and the selected cell is a conditional handover candidate cell of the UE, then the UE executes a handover to the selected cell; otherwise, if the selected cell is not a conditional handover candidate cell of the UE, then the UE performs the following RRC re-establishment initialization operations:

operation 1, release the secondary cell(s) of the MCG;

operation 2, release the configuration of the special cell (spCellConfig information element, including the configuration parameter(s) of the special cell);

operation 3, release delayBudgetReportingConfig, and stop the corresponding delay budget reporting timer T342; and operation 4, release overheatingAssistanceConfig, and stop the corresponding overheating indication prohibition timer T345.

The operations related to the RRC re-establishment initialization in step 3 may be performed before transmission of an RRC connection re-establishment request message is initiated, or may also be performed after initiation of the RRC connection re-establishment request message.

In this step, the UE being configured with a conditional handover may also refer to that the UE has the stored conditional handover configuration.

Embodiment 3

Provided in this embodiment is an enabling method in which UE configured with a conditional handover can use a stored conditional handover configuration to resume connection when an RLF of an MCG occurs. On the basis of the method in this embodiment, when an RLF of the MCG occurs, the UE can determine whether to use a conventional method to directly initiate an RRC re-establishment procedure or to use the stored conditional handover configuration to attempt to resume connection.

In step 1, an RRC message from a base station is received, the RRC message including a conditional handover link recovery enabling indication. The conditional handover link recovery enabling indication is used to enable the UE to attempt to execute a conditional handover to recover a radio link according to the stored conditional handover configuration when an MCG RLF occurs. In other words, the conditional handover link recovery enabling indication is used to determine whether the UE is allowed to attempt to execute a conditional handover to recover a radio link according to the stored conditional handover configuration when an MCG RLF occurs. In other words, the conditional handover link recovery enabling indication is used to enable the UE to attempt to execute a conditional handover to recover a radio link when an MCG RLF occurs and if a suitable cell exists among conditional handover candidate cells in the stored conditional handover configuration.

In step 2, the configuration in step 1 is used to enable a conditional handover link recovery function. That is, when an MCG RLF occurs and if a suitable cell exists among the conditional handover candidate cells in the stored conditional handover configuration, then an attempt to execute a conditional handover to recover a radio link is performed.

Embodiment 4

Provided in this embodiment is an enabling method in which a fast MCG link recovery mechanism can be used if UE is configured with dual connectivity and when an RLF of an MCG occurs. On the basis of the method in this embodiment, when an RLF of the MCG occurs, the UE can determine whether to use a conventional method to directly initiate an RRC re-establishment procedure or to use the fast MCG link recovery mechanism to attempt to resume connection.

In step 1, an RRC message from a base station is received, the RRC message including a fast MCG link recovery enabling indication. The fast MCG link recovery enabling indication is used to enable the UE to initiate an MCG failure procedure to recover a radio link when an MCG RLF occurs. In other words, the fast MCG link recovery enabling indication is used to determine whether the UE can initiate an MCG failure procedure to recover a radio link when an MCG RLF occurs. The initiating an MCG failure procedure may also refers to transmitting an MCG failure information message to an SCG.

In step 2, the configuration in step 1 is used to enable a fast MCG link recovery function. That is, when an MCG RLF occurs and if a suitable cell exists among the conditional handover candidate cells in the stored conditional handover configuration, then an attempt to execute a conditional handover to recover a radio link is performed.

Since the fast MCG link recovery function is applicable to UE configured with DC, a step prior to step 1 or step 1 further includes: receiving, by the UE, an RRC message from the base station for configuring the DC, namely, an RRC message including an SCG configuration (secondary-CellGroup information element). The RRC message may be a message the same as or different from the RRC message used to enable the fast MCG link recovery function in step 1. The DC may be a dual connectivity type such as NR DC, EN-DC, NE-DC, NG-EN-DC, LTE DC, or the like.

Embodiment 5

Provided in this embodiment is a method for UE configured with a conditional handover and DC/SCG to determine, when an RLF of an MCG occurs, whether to use a stored conditional handover configuration or an MCG failure procedure to resume connection. On the basis of the method in this embodiment, when an RLF of the MCG occurs, the UE can determine whether to use a conventional method to directly initiate an RRC re-establishment procedure or to use the stored conditional handover configuration to attempt to resume connection or to use an MCG failure procedure to attempt to resume connection.

In step 1, an RRC message from a base station is received, the RRC message including link recovery indication information. The link recovery indication information is used to indicate whether the UE uses the stored conditional handover configuration or the MCG failure procedure to resume connection when an MCG RLF occurs. If the link recovery indication information indicates/is set to be a conditional handover, then it is indicated that the UE attempts to execute a conditional handover to recover a radio link according to the stored conditional handover configuration when an MCG RLF occurs. In other words, it is indicated that when an MCG RLF occurs and if a suitable cell exists among conditional handover candidate cells in the stored conditional handover configuration, then an attempt to execute a conditional handover to recover a radio link is performed. If the link recovery indication information indicates/is set to be fast MCG link recovery, then it is indicated that when an MCG RLF occurs and if the UE is configured with DC, then the UE can attempt to resume the radio link by initiating an MCG failure procedure and transmitting MCG failure information to an SCG.

In step 2, the configuration in step 1 is used. That is, when an MCG RLF occurs and if a suitable cell exists among the conditional handover candidate cells in the stored conditional handover configuration, then an attempt to execute a conditional handover to resume the radio link is performed. When an MCG RLF occurs on the UE, if the UE has both the stored conditional handover configuration and an SCG configuration, then the UE determines, according to the indication information received in step 1, whether to attempt to execute a conditional handover to resume the radio link according to the stored conditional handover configuration or to attempt to resume the radio link by initiating an MCG failure procedure and transmitting MCG failure information to the SCG. If the link recovery indication information indicates/is set to be a conditional handover, then the UE determines to attempt to execute a conditional handover to resume the radio link according to the stored conditional handover configuration. In other words, if a suitable cell exists among the conditional handover candidate cells in the stored conditional handover configuration, then an attempt to execute a conditional handover to resume the radio link is performed. If the link recovery indication information indicates/is set to be fast MCG link recovery, then if the UE is configured with DC, then the UE can attempt to resume the radio link by initiating an MCG failure procedure and transmitting MCG failure information to the SCG.

The procedure of the attempt to execute a conditional handover or the procedure of initiation of the fast MCG link recovery is described in the foregoing parts of the present disclosure, and is not repeatedly described herein.

Embodiment 6

Provided in this embodiment is another method for UE configured with a conditional handover and DC/SCG to determine, when an RLF of an MCG occurs, whether to use a stored conditional handover configuration or an MCG failure procedure to resume connection. On the basis of the method in this embodiment, when an MCG RLF occurs, the UE can determine whether to use a conventional method to directly initiate an RRC re-establishment procedure or to use the stored conditional handover configuration to attempt to resume connection or to use an MCG failure procedure to attempt to resume connection.

In step 1, an MCG RLF occurs.

In step 2, UE determines whether an SCG/DC is configured and whether SCG link quality is good; if so, namely, the UE is configured with an SCG/DC and the SCG link quality is good, then the UE performs step 3A; otherwise, namely, the UE is not configured with any SCG/DC or the SCG link quality is not good, then the UE performs step 3B.

In step 3A, an MCG failure information procedure is initiated to resume link connection. That is, link connection recovery is initiated by transmitting MCG failure information to the SCG.

In step 3B, the UE determines whether the UE has the stored conditional handover configuration. If the UE has the stored conditional handover configuration, then step 4A is performed; otherwise, if the UE does not have the stored conditional handover configuration, then the UE performs step 4B.

In step 4A, the UE determines to attempt to execute a conditional handover to recover a radio link according to the stored conditional handover configuration. In other words, an attempt to execute a conditional handover to resume the radio link is performed with respect to a suitable cell selected from conditional handover candidate cells in the stored conditional handover configuration.

In step 4B, an RRC connection re-establishment procedure is initiated to resume the link connection.

The SCG link quality being good described above may refer to that no RLF occurs or a timer T310 is not running, or that the SCG is not suspended. On the contrary, the SCG link quality being not good may refer to that an RLF occurs or the timer T310 is running, or that the SCG is suspended.

The procedure of the attempt to execute a conditional handover or the procedure of initiation of the fast MCG link recovery is described in the foregoing parts of the present disclosure, and is not repeatedly described herein.

Embodiment 7

Provided in this embodiment is another method for UE configured with a conditional handover and DC/SCG to determine, when an RLF of an MCG occurs, whether to use a stored conditional handover configuration or an MCG failure procedure to resume connection. On the basis of the method in this embodiment, when an RLF of the MCG occurs, the UE can determine whether to use a conventional method to directly initiate an RRC re-establishment procedure or to use the stored conditional handover configuration to attempt to resume connection or to use an MCG failure procedure to attempt to resume connection.

In step 1, an MCG RLF occurs.

In step 2, UE determines whether the UE has a stored conditional handover configuration. If the UE has the stored conditional handover configuration, then step 3A is performed; otherwise, if the UE does not have the stored conditional handover configuration, then the UE performs step 3B.

In step 3A, the UE determines to attempt to execute a conditional handover to recover a radio link according to the stored conditional handover configuration. In other words, an attempt to execute a conditional handover to resume the radio link is performed with respect to a suitable cell selected from conditional handover candidate cells in the stored conditional handover configuration.

In step 3B, the UE determines whether an SCG/DC is configured and whether SCG link quality is very good; if so, namely, the UE is configured with an SCG/DC and the SCG link quality is good, then the UE performs step 4A; otherwise, namely, the UE is not configured with any SCG/DC or the SCG link quality is not good, then the UE performs step 4B.

In step 4A, an MCG failure information procedure is initiated to resume link connection. That is, link connection recovery is initiated by transmitting MCG failure information to the SCG.

In step 4B, an RRC connection re-establishment procedure is initiated to resume the link connection.

The SCG link quality being good described above may refer to that no RLF occurs or a timer T310 is not running, or that the SCG is not suspended. On the contrary, the SCG link quality being not good may refer to that an RLF occurs or the timer T310 is running, or that the SCG is suspended.

The procedure of the attempt to execute a conditional handover or the procedure of initiation of the fast MCG link recovery is described in the foregoing parts of the present disclosure, and is not repeatedly described herein.

Embodiment 8

Provided in this embodiment is another method for UE configured with a conditional handover and DC/SCG to determine, when an RLF of an MCG occurs, whether to use a stored conditional handover configuration or an MCG failure procedure to resume connection. On the basis of the method in this embodiment, when an RLF of the MCG occurs, the UE can determine whether to use a conventional method to directly initiate an RRC re-establishment procedure or to use the stored conditional handover configuration to attempt to resume connection or to use an MCG failure procedure to attempt to resume connection.

In step 1, an MCG RLF occurs.

In step 2, UE determines whether the UE has a stored conditional handover configuration and whether a suitable cell exists among conditional handover candidate cells in the conditional handover configuration. If the UE has the stored conditional handover configuration and a suitable cell exists among the conditional handover candidate cells, then step 3A is performed; otherwise, if the UE does not have the stored conditional handover configuration or no suitable cell exists among the conditional handover candidate cells, then the UE performs step 3B.

The UE can determine, according to a measurement result of existing conditional handover monitoring or a measurement result corresponding to a conditional handover candidate cell measured according to a measurement configuration, whether a conditional handover candidate cell is a suitable cell.

In step 3A, the UE determines to attempt to execute a conditional handover to the selected conditional candidate cell to recover a radio link according to the stored conditional handover configuration.

In step 3B, the UE determines whether an SCG/DC is configured and whether SCG link quality is very good; if so, namely, the UE is configured with an SCG/DC and the SCG link quality is good, then the UE performs step 4A; otherwise, namely, the UE is not configured with any SCG/DC or the SCG link quality is not good, then the UE performs step 4B.

In step 4A, an MCG failure information procedure is initiated to resume link connection. That is, link connection recovery is initiated by transmitting MCG failure information to the SCG.

In step 4B, an RRC connection re-establishment procedure is initiated to resume the link connection.

The SCG link quality being good described above may refer to that no RLF occurs or a timer T310 is not running, or that the SCG is not suspended. On the contrary, the SCG link quality being not good may refer to that an RLF occurs or the timer T310 is running, or that the SCG is suspended.

The procedure of the attempt to execute a conditional handover or the procedure of initiation of the fast MCG link recovery is described in the foregoing parts of the present disclosure, and is not repeatedly described herein.

Embodiment 9

Provided in this embodiment is another method for UE configured with a conditional handover and DC/SCG to determine, when an RLF of an MCG occurs, whether to use a stored conditional handover configuration or an MCG failure procedure to resume connection. On the basis of the method in this embodiment, when an MCG RLF occurs, the UE can determine whether to use a conventional method to directly initiate an RRC re-establishment procedure or to use the stored conditional handover configuration to attempt to resume connection or to use an MCG failure procedure to attempt to resume connection.

In step 1, an MCG RLF occurs.

In step 2, UE determines whether an SCG/DC is configured and whether SCG link quality is good; if so, namely, the UE is configured with an SCG/DC and the SCG link quality is good, then the UE performs step 3A; otherwise, namely, the UE is not configured with any SCG/DC or the SCG link quality is not good, then the UE performs step 3B.

In step 3A, an MCG failure information procedure is initiated to resume link connection. That is, link connection recovery is initiated by transmitting MCG failure information to the SCG.

In step 3B, the UE determines whether the UE has the stored conditional handover configuration. If the UE has the stored conditional handover configuration, then step 4A is performed; otherwise, if the UE does not have the stored conditional handover configuration, then the UE performs step 4B.

In step 4A, the UE determines to attempt to execute a conditional handover to recover a radio link according to the stored conditional handover configuration. In other words, an attempt to execute a conditional handover to resume the radio link is performed with respect to a suitable cell selected from conditional handover candidate cells in the stored conditional handover configuration.

In step 4B, an RRC connection re-establishment procedure is initiated to resume the link connection.

The SCG link quality being good described above may refer to that no RLF occurs or a timer T310 is not running, or that the SCG is not suspended. On the contrary, the SCG link quality being not good may refer to that an RLF occurs or the timer T310 is running, or that the SCG is suspended.

The procedure of the attempt to execute a conditional handover or the procedure of initiation of the fast MCG link recovery is described in the foregoing parts of the present disclosure, and is not repeatedly described herein.

Embodiment 10

Figure 3:
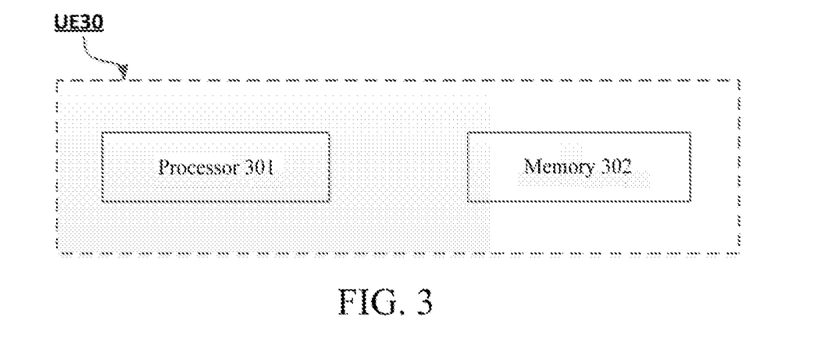
FIG. 3 is a block diagram showing user equipment (UE) involved in the present invention.

In this embodiment, the user equipment according to the present disclosure is described. FIG. 3 is a block diagram showing the user equipment (UE) involved in the present invention. As shown in FIG. 3, the UE 30 includes a processor 301 and a memory 302. The processor 301 may include, for example, a microprocessor, a microcontroller, an embedded processor, and the like. The memory 302 may include, for example, a volatile memory (such as a random access memory (RAM)), a hard disk drive (HDD), a non-volatile memory (such as a flash memory), or other memories. The memory 302 stores program instructions. When run by the processor 301, the instructions can perform the method for radio link recovery described in detail in the present invention.

In the present disclosure, some different embodiments can cooperate with each other.

In the present disclosure, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer, and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in the present specification may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A User equipment (UE), comprising:
a processor; and
a memory storing instructions, wherein the instructions, when run by the processor, cause the UE to, upon initiation of an radio resource control (RRC) connection reestablishment procedure and based on a determination by the UE that the UE is not configured with a conditional handover configuration, release Master Cell Group (MCG) Secondary Cell(s) (SCell(s)), release a special cell configuration configured in an spCellConfig information element (IE), release a configuration in an delayBudgetReportingConfig information element (IE) and stop timer T342, and release a configuration in an overheatingAssistanceConfig information element (IE) and stop timer T345, the instructions, when run by the processor, cause the UE to select a cell, the instructions, when run by the processor, cause the UE to perform a handover according to a stored conditional handover configuration associated with the selected cell, wherein the handover is performed based on a determination by the UE that the UE is configured with the conditional handover configuration and the selected cell is a conditional handover candidate cell indicated in a reconfigurationWithSync information element (IE) in the stored conditional handover configuration for MCG, and the instructions, when run by the processor, cause the UE to, before initiating transmission of an RRC Reestablishment Request message and based on a determination by the UE that the UE is configured with the conditional handover configuration and the selected cell is not a conditional handover candidate cell indicated in the reconfigurationWithSync IE, release the MCG SCell(s), release the special cell configuration configured in the spCellConfig IE, release the configuration in the delayBudgetReportingConfig IE and stop timer T342, and release the configuration in the overheatingAssistanceConfig IE and stop timer T345.

2. The UE according to claim 1, wherein the instructions, when run by the processor, cause the UE to receive an indication in an RRC message, wherein the indication is used to enable the UE to perform conditional handover if a cell selected based on MCG failure is a target candidate cell.

3. A method performed by a user equipment (UE), the method comprising:
upon initiation of an radio resource control (RRC) connection reestablishment procedure and based on a determination by the UE that the UE is not configured with a conditional handover configuration, releasing Master Cell Group (MCG) Secondary Cell(s) (SCell(s)), releasing a special cell configuration configured in an spCellConfig information element (IE), releasing a configuration in an delayBudgetReportingConfig information element (IE) and stopping timer T342, and releasing a configuration in an overheatingAssistanceConfig information element (IE) and stopping timer T345;
selecting a cell;
performing a handover according to a stored conditional handover configuration associated with the selected cell, wherein the handover is performed based on a determination by the UE that the UE is configured with the conditional handover configuration and the selected cell is a conditional handover candidate cell indicated in a reconfigurationWithSync information element (IE) in the stored conditional handover configuration for MCG, and before initiating transmission of an RRC Reestablishment Request message and based on a determination by the UE that the UE is configured with the conditional handover configuration and the selected cell is not a conditional handover candidate cell indicated in the reconfigurationWithSync IE, releasing the MCG SCell(s), releasing the special cell configuration configured in the spCellConfig IE, releasing the configuration in the delayBudgetReportingConfig IE and stopping timer T342, and releasing the configuration in the overheatingAssistanceConfig IE and stopping timer T345.

4. The method according to claim 3, further comprising:
receiving an indication in an RRC message, wherein the indication is used to enable the UE to perform conditional handover if a cell selected based on MCG failure is a target candidate cell.

* * * * *